US011066550B2

(12) United States Patent
Kaplan et al.

(10) Patent No.: US 11,066,550 B2
(45) Date of Patent: Jul. 20, 2021

(54) POLYETHER-EPOXIDE POLYMER COMPOSITIONS

(71) Applicant: STEPAN COMPANY, Northfield, IL (US)

(72) Inventors: Warren A. Kaplan, Libertyville, IL (US); Jennifer S. Westfall, Bethel Park, PA (US)

(73) Assignee: STEPAN COMPANY, Northfield, IL (US)

( * ) Notice: Subject to any disclaimer, the term of this patent is extended or adjusted under 35 U.S.C. 154(b) by 129 days.

(21) Appl. No.: 16/571,970

(22) Filed: Sep. 16, 2019

(65) Prior Publication Data

US 2020/0010666 A1 Jan. 9, 2020

Related U.S. Application Data

(63) Continuation of application No. PCT/US2017/045867, filed on Aug. 8, 2017.

(60) Provisional application No. 62/479,871, filed on Mar. 31, 2017.

(51) Int. Cl.
*C08G 59/62* (2006.01)
*C08G 59/24* (2006.01)
*C08G 59/68* (2006.01)
*C08G 59/72* (2006.01)
*C08L 63/00* (2006.01)
*C08G 59/06* (2006.01)
*C08G 65/40* (2006.01)

(52) U.S. Cl.
CPC ............ *C08L 63/00* (2013.01); *C08G 59/063* (2013.01); *C08G 65/4087* (2013.01)

(58) Field of Classification Search
None
See application file for complete search history.

(56) References Cited

U.S. PATENT DOCUMENTS

| 3,404,018 | A | | 10/1968 | Hicks |
| 3,621,074 | A | | 11/1971 | Siggel et al. |
| 5,356,715 | A | * | 10/1994 | Levine .................... B32B 15/08 428/416 |
| 9,169,418 | B2 | | 10/2015 | Sakane |
| 2004/0072963 | A1 | | 4/2004 | Sakane |
| 2010/0041794 | A1 | | 2/2010 | Earls et al. |
| 2010/0126664 | A1 | | 5/2010 | O'Brien |
| 2011/0288204 | A1 | | 11/2011 | Grablowitz et al. |
| 2016/0130393 | A1 | | 5/2016 | Liao et al. |

FOREIGN PATENT DOCUMENTS

| CN | 101358122 A | 2/2009 |
| CN | 104212405 A | 12/2014 |
| CN | 104745138 A | 7/2015 |
| EP | 1512705 A1 | 3/2005 |
| EP | 2325221 A1 | 5/2011 |
| GB | 793915 A * | 4/1958 | ............. C08L 63/00 |
| JP | H0148928 B2 | 10/1989 |
| JP | H0364529 B2 | 10/1991 |
| JP | H05320556 A | 12/1993 |
| KR | 100726684 B1 | 6/2007 |
| RU | 2457220 C1 | 7/2012 |
| WO | 2014072515 A1 | 5/2014 |
| WO | 2015160468 A1 | 10/2015 |
| WO | 2016105722 A1 | 6/2016 |

OTHER PUBLICATIONS

Akkapeddi et al., "Chain Extension of Pet and Nylon in an Extruder", Polym. Prepr. (Am. Chem. Soc., Div. Polym. Chem.) 29 (1988) 567-569.
Anzures et al., "The Effect of Polyester Polyol Structure on the Reactivity of Photocurable Epoxide Systems", RadTech Eur. 95 Conf. Proc. 574-583.
Arnebold et al., "Covalent integration of differently structured polyester polyols improves the toughness and strength of cationically polymerized, amorphous epoxy networks", J. Appl. Polym. Sci. 133 (2016) 43986.
Blank et al., "Catalysis of the Epoxy-Carboxyl Reaction", J. Coat. Technol. 74 (2002) 33-41.
Crivello et al., "The Effects of Polyols as Chain Transfer Agents and Flexibilizers in Photoinitiated Cationic Polymerization", J. Radiat. Curing Oct. 1986, pp. 3-9.
Eaton, "Coating Crosslinking Reactions Using Cycloaliphatic Epoxides", Paint Coat. Ind. Jun. 1999, 76-80.
Haralabakopoulous et al., "Chain Extension of Poly(ethylene terephthalate) with Diepoxides by a Reactive Extrusion-Simulating Process", Polym. Prepr. (Am. Chem. Soc., Div. Polym. Chem.) 38 (1997) 168-169.
Harani et al., "Toughening of Epoxy Resin Using Hydroxyl-Terminated Polyesters", J. Appl. Polym. Sci. 71 (1999) 29-38.
Raj et al., "Studies on Glass Reinforced Composites based on modified Epoxy Resin and Acrylic Acid System", Int. J. Plast Technol. 9 (2005) 451.
Ratna et al., "Thermal and Mechanical Properties of a Hydroxyl-functional Dendritic Hyperbranched Polymer and Trifunctional Epoxy Resin Blends", Polym. Eng. Sci. 41 (2001) 1815.
Shalati et al., "High performance accelerated all acrylic coatings Kinetics and mechanistic aspects of non-isocyanate coatings", Prog. Org. Coat. 48 (2003) 236.

(Continued)

Primary Examiner — Michael J Feely
(74) Attorney, Agent, or Firm — Dilworth IP, LLC

(57) ABSTRACT

Polyether-epoxide polymer compositions are disclosed. The compositions comprise a reaction product of a polyepoxide compound and a polyol composition comprising a polyether polyol. The ratio of epoxy equivalents to hydroxyl equivalents is within the range of 0.5:1 to 3:1. The polyether-epoxide composition has a $T_g$ within the range of −40° C. to 60° C. The polyether polyol has a hydroxyl value within the range of 150 to 800 mg KOH/g and an average hydroxyl functionality within the range of 3.5 to 8.0. In some aspects, the polyol composition further comprises a polyester polyol. Low- and elevated-temperature processes catalyzed by bases or Lewis acids for making the polyether-epoxide compositions are also disclosed. In a simple yet innovative approach, a new class of polymers useful for coatings, elastomers, adhesives, sealants, and other valuable products is assembled from readily available starting materials without reliance on polyamines or polyisocyanates.

22 Claims, No Drawings

(56) References Cited

OTHER PUBLICATIONS

Shecter et al., "Glycidyl Ether Reactions with Alcohols, Phenols, Carboxylic Acids, and Acid Anhydrides", Ind. Eng. Chem. 48 (1956) 86.
Spyrou, "Radiation initiated cationic polymerization with", Prog. Org. Coat. 43 (2001) 25.
Tomuta et al., "New chemically reworkable epoxy coatings obtained by the addition of polyesters with star topologies to diglycidyl ether of bisphenol A resins", Prog. Org. Coat. 76 (2013) 1616.
Worzakowska, "Synthesis, Characterization, Thermal, and Viscoelastic Properties of an Unsaturated Epoxy Polyester Cured with Different Hardeners", J. Appl. Polym. Sci. 110 (2008) 3582.
Wu et al., "Kinetic modelling of crosslinking reactions for cycloaliphatic epoxides with hydroxyl- and carboxyl-functionalized acrylic copolymers: 1. pH and temperature effects", Polymer 39 (1999) 5747.
Xu et al., "Curing behavior and toughening performance of epoxy resins containing hyperbranched polyester", Polym. Adv. Technol. 15 (2004) 639.
PCT International Search Report and Written Opinion of the International Searching Authority dated Oct. 23, 2017 in corresponding Application No. PCT/US2017/045860, 8 pages.
PCT International Search Report and Written Opinion of the International Searching Authority dated Oct. 20, 2017 in corresponding Application No. PCT/US2017/045865, 9 pages.
PCT International Search Report and Written Opinion of the International Searching Authority dated Nov. 23, 2017 in corresponding Application No. PCT/US2017/045867, 8 pages.

\* cited by examiner

POLYETHER-EPOXIDE POLYMER COMPOSITIONS

FIELD OF THE INVENTION

The invention relates to polyether-epoxide polymer compositions and their use in coatings, elastomers, adhesives, and other applications.

BACKGROUND OF THE INVENTION

Epoxy-functional compositions have long been known as building blocks for making epoxy resins. Reaction products of bisphenols and epichlorohydrin, for instance, are mainstays of the epoxy resin industry and have been sold for years as EPON® resins (Hexion Specialty Chemicals). Epoxy resins react with "hardeners" or other crosslinkers—usually polyamines, polycarboxylic acids, or polythiols—to give cured, high polymers for adhesives and other end-use applications.

Epoxy resins are also commonly reacted with acrylic or methacrylic acids to produce "vinyl ester" resins. Vinyl esters have hydroxyl and acrylic functionality and are viewed as a "high end" variety of unsaturated polyester resin. Like unsaturated polyester resins, vinyl ester resins cure with styrene and a free-radical initiator, but they can give plastics with properties that cannot be easily achieved with general-purpose unsaturated polyester resins.

Polyether polyols occupy yet another distinct realm. These products are usually made by reacting one or more hydroxy- or amine-functional initiators with epoxides (usually ethylene oxide, propylene oxide, butylene oxides, or mixtures of these), cyclic ethers (e.g., tetrahydrofuran), or mixtures thereof in a ring-opening polymerization. Epoxide polymerizations are usually catalyzed by bases (e.g., KOH), metal complexes (e.g., double metal cyanide compounds), or Lewis acids (e.g., $BF_3$). Strong acids (e.g., fluoroboric acid, fuming sulfuric acid) are more commonly used to polymerize tetrahydrofuran, although weak acids can be used with certain activators (e.g., montmorillonite clays and acetic acid). Polyether polyols are intermediates that react with polyisocyanates to give polyurethanes. Polyether polyols are produced over a wide range of hydroxyl functionalities depending upon the choice of initiator. Polyether polyols are commonly used to produce flexible, molded, or rigid polyurethane foams and polyurethane elastomers, coatings, adhesives, and sealants.

Although polyether polyols can at least in theory be used to cure epoxy resins, conventional practice suggests that polyamines, which will react much more quickly with the epoxide groups, are better suited for this purpose.

Consequently, despite the long-standing availability of epoxy resins and polyether polyols, relatively little has been reported about the possible benefits of these reaction products.

A challenge with most epoxy-based products is in making products having desirable flexibility at low cost while preserving other important properties. Most epoxy-based products have relatively high glass-transition temperatures ($T_g$>80° C.) and low ultimate elongations (<10%).

Previously, we prepared polyester-epoxide polymer compositions that are reaction products of a polyepoxide compound and a polyester polyol composition. We found that well-known building blocks drawn from different polymer technologies (urethane, epoxy, UPR) could be assembled to give a new class of polymers that are useful for coatings, elastomers, adhesives, sealants, and other valuable products. Commercially available polyester polyols having low average hydroxyl functionalities (e.g., 2-3) provide good results. The polyester-epoxide compositions retain many of the benefits of traditional epoxide polymer products, but they have increased elongation and lower $T_g$.

The industry would benefit from the availability of additional epoxy-based products having increased elongation, lower $T_g$ values, and a favorable overall balance of properties in adhesives, coatings, elastomers, and other similar products. Desirably, the products could be made using commercially available or readily made starting materials, conventional equipment, and ordinary process conditions. Preferably, the products could be tailored to meet targets for flexibility, impact resistance, hardness, stiffness, abrasion resistance, and other properties important to producers of coatings, adhesives, sealants, and elastomers. Ideally, products with excellent physical and mechanical properties could be realized without using isocyanates or polyamine curatives, which pose environmental and other challenges.

SUMMARY OF THE INVENTION

In one aspect, the invention relates to a polyether-epoxide polymer composition. The composition comprises a reaction product of a polyepoxide compound and a polyol composition. The polyepoxide compound has an equivalent weight within the range of 125 to 250 g/eq. The polyol composition comprises a polyether polyol having a hydroxyl value within the range of 150 to 800 mg KOH/g, an average hydroxyl functionality within the range of 3.5 to 8.0. The ratio of epoxy equivalents of the polyepoxide compound to hydroxyl equivalents of the polyol composition is within the range of 0.5:1 to 3:1. The polyether-epoxide polymer composition has a glass-transition temperature as measured by differential scanning calorimetry within the range of −40° C. to 60° C.

In some aspects, the polyol composition further comprises a polyester polyol. Inclusion of the polyester polyol can allow formulators to boost the modulus, elongation, and total energy absorption properties of elastomers, the impact and abrasion resistance of coatings, and bonding strength in adhesives.

The invention includes processes for making the polyether-epoxide polymer compositions described above. One such process ("low-temperature process") for making the compositions comprises reacting, at a temperature within the range of 0° C. to 40° C. in the presence of a catalyst, a mixture comprising the polyepoxide compound and the polyol composition comprising a polyether polyol as described above. The ratio of epoxy equivalents of the polyepoxide compound to hydroxyl equivalents of the polyol composition is within the range of 0.5:1 to 3:1, and the resulting polyether-epoxide polymer composition has a $T_g$ within the range of −40° C. to 60° C. The catalyst for this process preferably comprises a Lewis acid compound. In a preferred aspect, the reaction is performed at room temperature.

An alternative process ("elevated-temperature process") comprises heating, at a temperature within the range of 40° C. to 100° C., optionally in the presence of a catalyst, a mixture comprising the polyepoxide compound and the polyol composition comprising a polyether polyol as described above. The ratio of epoxy equivalents of the polyepoxide compound to hydroxyl equivalents of the polyol composition is within the range of 0.5:1 to 3:1, and the polyether-epoxide polymer composition has a $T_g$ within the range of −40° C. to 60° C. In some aspects, the heating is performed in the presence of a base or Lewis acid catalyst.

Either of the above-described processes can be followed by a post-cure. When a Lewis acid is used, the post-cure can be at room temperature or elevated (50° C. to 150° C.) temperature. When a base catalyst is used, an elevated temperature post-cure is desirable.

Well-known building blocks drawn from different polymer technologies (urethane, epoxy) can be assembled to give a new class of polymers ("polyether-epoxide polymer compositions") that are useful for coatings, elastomers, adhesives, sealants, and other valuable products. Surprisingly, these products fulfill industry needs without relying on polyamines, which are the most widely used epoxide hardeners, or polyisocyanates, which are principal reactants for polyurethanes. The polyether-epoxide polymer compositions retain many of the benefits of traditional epoxide polymer products, but they can have increased elongation, improved impact resistance, and adjustable $T_g$. Excellent products can be made from commercially available or easily synthesized materials, particularly high-functionality polyether polyols. Additional benefits can be achieved by blending polyether with polyester polyols, particularly aromatic polyester polyols. The polyether-epoxide polymer compositions are convenient to prepare in a one-step process. Overall, the invention creates a new class of polymers and invites formulators to further explore this simple yet innovative approach to synthesizing thermoset polymers.

DETAILED DESCRIPTION OF THE INVENTION

In one aspect, the invention relates to a polyether-epoxide polymer composition that comprises a reaction product of a polyepoxide compound and a polyol composition comprising a polyether polyol.

The Polyepoxide Compound

Suitable polyepoxide compounds have two or more epoxide groups per molecule and an equivalent weight within the range of 125 to 250 g/eq., or in some aspects 150 to 240 g/eq. or 170 to 235 g/eq.

In preferred aspects, the polyepoxide compounds have an average of 2 to 4 epoxide groups per molecule ("average epoxide functionality"). In some aspects, the average epoxide functionality is from 2 to 3, 2.0 to 2.8, or about 2.

Some suitable polyepoxide compounds are commercially available, while others are readily synthesized from the reaction of epichlorohydrin and a suitable polyol or polyamine precursor, preferably from epichlorohydrin and an aromatic or cycloaliphatic polyol or polyamine.

In some aspects, the polyepoxide compound is a reaction product of a bisphenol (e.g., bisphenol A, bisphenol AP, bisphenol BP, bisphenol C, bisphenol F, bisphenol S, bisphenol Z, or the like) and epichlorohydrin. In other aspects, the polyepoxide compound is the reaction product of a hydrogenated bisphenol and epichlorohydrin. In other words, in some cases the polyepoxide compound is a "diglycidyl ether" of the bisphenol or hydrogenated bisphenol. Many of these materials are commercially available. For instance, suitable polyepoxide compounds include the EPON® 800 series of epoxy resins (products of Hexion Specialty Chemicals), mostly from bisphenol A or bisphenol F, such as EPON® resins 825, 826, 828, 830, 834, 862, and the like. Suitable bisphenol F-based resins also include EPALLOY® 8220, EPALLOY® 8230, and EPALLOY® 8240, products of CVC Thermoset Specialties.

Suitable epoxide compounds include bisphenol diglycidyl ethers in which the aromatic rings have been hydrogenated, such as EPALLOY® 5000 and EPALLOY® 5001, or modified with alkyl or functional groups, such as EPALLOY® 7200. Suitable polyepoxide compounds include di-, tri-, or tetrafunctional aromatic polyepoxides such as resorcinol diglycidyl ether (available as ERISYS™ RDGE from CVC Thermoset Specialties), the triglycidyl ether of tris(hydroxyphenyl)ethane (available, for instance, as EPALLOY® 9000), and the tetraglycidyl ether of m-xylenediamine (available as ERISYS™ GA 240). Suitable polyepoxide compounds also include aromatic and cycloaliphatic glycidyl esters, such as the diglycidyl ester of isophthalic acid, phthalic acid, or terephthalic acid and hydrogenated versions thereof, such as hexahydrophthalic acid diglycidyl ester (available, for instance, as EPALLOY® 5200).

In some aspects, the polyepoxide compound is an aliphatic diglycidyl ether, particularly aliphatic diglycidyl ethers having average epoxide functionalities of at least 2, preferably at least 3. Suitable aliphatic diglycidyl ethers include, for example, 1,4-butanediol diglycidyl ether, 1,4-cyclohexanediol diglycidyl ether, neopentyl glycol diglycidyl ether, ethylene glycol diglycidyl ether, 2-methyl-1,3-propanediol diglycidyl ether, 1,6-hexanediol diglycidyl ether, dipropylene glycol diglycidyl ether, glycerol triglycidyl ether, trimethylolpropane triglycidyl ether, pentaerythritol tetraglycidyl ether, and the like, and mixtures thereof. Suitable polyepoxide compounds of this type are easily made by reacting the polyols with excess epichlorohydrin; many are commercially available from CVC Thermoset Specialties under the ERISYS™ mark or from other suppliers.

Mixtures of various types of polyepoxide compounds can be used. In preferred aspects, the polyepoxide compound comprises at least 50 wt. %, at least 60 wt. %, or at least 75 wt. %, of an aromatic polyepoxide compound, a cycloaliphatic polyepoxide compound, or a combination thereof.

The polyepoxide compound is used in an amount such that the ratio of epoxy equivalents of the polyepoxide compound to hydroxyl equivalents of the polyol composition comprising a polyether polyol (also described herein as the "epoxy/OH eq. ratio") is within the range of 0.5:1 to 3:1. In other aspects, the ratio of epoxy to hydroxyl equivalents will range from 0.8:1 to 2:1, or from 1:1 to 1.8:1.

The amount of polyepoxide compound used can vary and will depend on many factors, including the nature of the polyepoxide compound, the nature and proportion of the polyol composition, the desired stoichiometry, and other factors. In general, however, the amount of polyepoxide compound will be within the range of 30 to 70 wt. %, 40 to 65 wt. %, or 45 to 55 wt. %, based on the amount of polyether-epoxide polymer composition.

The Polyol Composition

The polyether-epoxide polymer composition comprises a reaction product of the polyepoxide compound and a polyol composition. The polyol composition comprises a polyether polyol.

Suitable polyether polyols have average hydroxyl functionalities within the range of 3.5 to 8.0. These polyols are readily synthesized by ring-opening polymerization of propylene oxide, ethylene oxide, butylene oxides, tetrahydrofuran, or mixtures thereof, in the presence of hydroxy- and/or amine-functional initiators. In some cases, the reactions are catalyzed by bases (e.g., KOH), transition metal catalysts (e.g., double metal cyanide catalysts), Lewis acids (e.g., $BF_3$ catalysts) or the like. A variety of diols, triols, and higher functionality starters can be used alone or in combination provided that the average hydroxyl functionality of the polyol is between 3.5 and 8.0. Typically, sucrose, sorbitol, or another high-functionality starter is used alone or in combination with a diol (e.g., ethylene glycol, diethylene glycol), triol (e.g., glycerin, trimethylolpropane, triethanolamine), or amine starter (e.g., ethylene diamine) to achieve the targeted functionality.

Many suitable polyether polyols having average hydroxyl functionalities within the range of 3.5 to 8.0 are commercially available. Examples include the MULTRANOL® products from Covestro (e.g., MULTRANOL® 4030, MULTRANOL® 4034, MULTRANOL® 4035, MULTRANOL® 4050, MULTRANOL® 4063, MULTRANOL® 6501, MULTRANOL® 8162, MULTRANOL® 8164, MULTRANOL® 9181, and MULTRANOL® 9196), the CARPOL® products from Carpenter (CARPOL® GSP-280, CARPOL® GSP-355, CARPOL® GSP-520, CARPOL® SP-477, CARPOL® SPA-357, CARPOL® SPA-530, CARPOL® EDAP-770, and CARPOL® EDAP-800), the VORANOL® products from Dow Chemical (VORANOL® 280, VORANOL® 370, and VORANOL® 490), and the JEFFOL® products from Huntsman (JEFFOL® S-490, JEFFOL® SA-499, JEFFOL® SD-361, JEFFOL® SD-441, JEFFOL® SG-360, and JEFFOL® SG-522).

In suitable polyol compositions, the polyether polyol will have a hydroxyl value within the range of 150 to 800 mg KOH/g. In some aspects, the polyether polyol will have a hydroxyl value within the range of 150 to 550 mg KOH/g, or within the range of 150 to 400 mg KOH/g.

The polyether polyols will have average hydroxyl functionalities within the range of 3.5 to 8.0. In some aspects, the polyether polyol will have an average hydroxyl functionality within the range of 3.7 to 7.0 or 4.0 to 7.0. As shown in Tables 1 and 2, we found that polyether polyols having average hydroxyl functionalities from 3.5 to 8.0 generally provide fully cured polyether-epoxide polymer compositions with the most favorable balance of properties, particularly in terms of hardness, tensile strength, modulus, elongation, and total energy absorption (elastomers); impact resistance and abrasion resistance (coatings); and lap shear strength (adhesives).

The polyol composition can include polycarbonate polyols, or other kinds of polyols in addition to the polyether polyol (and optional polyester polyol). In general, the polyol composition comprises at least 10 mole %, in some aspects at least 20 mole %, in other aspects at least 40 mole % or at least 60 mole %, of one or more polyether polyols. In some aspects, the polyol composition will consist of or consist essentially of one or more polyether polyols.

As indicated earlier, the amount of polyol composition used will be an amount effective to give a ratio of epoxy equivalents of the polyepoxide compound to hydroxyl equivalents of the polyol composition (i.e., an epoxy/OH eq. ratio) within the range of 0.5:1 to 3:1, 0.8:1 to 2:1, or 1:1 to 1.8:1.

The amount of polyol composition used can vary and will depend on many factors, including the nature and amount of the polyepoxide compound, the nature of the polyol composition, the desired stoichiometry, and other factors. In general, however, the amount of polyol composition will be within the range of 30 to 70 wt. %, 40 to 65 wt. %, or 45 to 55 wt. %, based on the amount of polyether-epoxide polymer composition.

In some preferred aspects, the polyol composition further comprises one or more polyester polyols. Suitable polyester polyols are well known and include aromatic and aliphatic polyester polyols. These polyols are terminated with hydroxyl groups and generally have low acid numbers (i.e., below 5 mg KOH/g). Suitable polyester polyols are readily synthesized by condensation polymerization of dicarboxylic acids, esters, or anhydrides with low molecular weight diols, polyols, or their mixtures. Suitable dicarboxylic acids, esters, or anhydrides include, for example, phthalic anhydride, isophthalic acid, terephthalic acid, dimethyl terephthalate, trimellitic anhydride, maleic anhydride, succinic anhydride, succinic acid, dimethyl succinate, diethyl adipate, glutaric acid, adipic acid, sebacic acid, suberic acid, and the like, and combinations thereof. Suitable diols and polyols useful for making polyester polyols include, for example, ethylene glycol, propylene glycol, 2-methyl-1,3-propanediol, 1,4-butanediol, 1,6-hexanediol, diethylene glycol, dipropylene glycol, triethylene glycol, tripropylene glycol, neopentyl glycol, 1,4-cyclohexanedimethanol, glycerin, trimethylolpropane, trimethylolethane, pentaerythritol, and the like, and combinations thereof.

Many suitable polyester polyols for use herein are commercially available from Stepan Company and other polyol suppliers. Examples include the STEPANPOL® PS-, PC-, PD-, PH-, PHN-, PN-, and AA-series polyols, products of Stepan. Examples include STEPANPOL® PS-2402, STEPANPOL® PC 1028-210, and STEPANPOL® PS-3524 (aromatic polyester polyols) and STEPANPOL® PC-101-210, STEPANPOL® PC-102-210, STEPANPOL® PC 105-210, STEPANPOL® PC 107-210, and STEPANPOL® PC 1040-210 (aliphatic polyester polyols) and STEPANPOL® 1021-210 (an aliphatic/aromatic polyester polyol). Commercially available products include TERATE® and TERRIN™ polyols from INVISTA, TEROL® polyols from Huntsman, LUPRAPHEN® polyols from BASF, DESMOPHEN® polyols from Covestro, FOMREZ® polyols from Chemtura, ISOEXTER™ and DIEXTER-G™ polyols from Coim, PIOTHANE® polyols from Panolam, and MILLESTER™ polyols from Polyurethane Specialties.

When a polyester polyol is included, it is preferably used in an amount within the range of 10 to 90 mole %, 20 to 80 mole %, 25 to 75 mole %, or 50 to 75 mole %, based on the amount of polyol composition.

When a polyester polyol is included, the polyester polyol will have primarily hydroxyl end groups and a limited proportion of carboxylic acid end groups, and it consequently will have a low acid number, i.e., less than 5 mg KOH/g. In some aspects, the polyester polyol will have an acid number less than 3 mg KOH/g, less than 2 mg KOH/g, or less than 1 mg KOH/g.

Polyether-Epoxide Polymer Compositions

The reaction product of the polyepoxide compound and the polyol composition comprising a polyether polyol is a polyether-epoxide polymer composition. The polyether-epoxide polymer compositions are distinguishable from conventional epoxy or urethane products in having a unique balance of properties.

For instance, the polyether-epoxide polymer compositions have an adjustable or tunable glass-transition temperature ($T_g$), as measured by differential scanning calorimetry (DSC), within the range −40° C. to 60° C. In some aspects, the $T_g$ of the polyether-epoxide polymer composition will be within the range of −30° C. to 35° C., from −20° C. to 30° C., or within the range of −5° C. to 30° C.

When compared with conventional epoxy products, the polyether-epoxide polymer compositions can have increased ultimate elongations (i.e., "elongation at break," hereinafter simply "elongation"). In some aspects, the polyether-epoxide polymer compositions will have elongations (as measured by ASTM D412, Method A) of at least 30%, at least 40%, at least 60%, or at least 80%. In other aspects, the polyether-epoxide polymer compositions will have elongations within the range of 30% to 500%, 45% to 300%, or 50% to 200%. As shown in Tables 1-4, below, polyether-epoxide polymer compositions with a wide range of elongations and stiffness can be produced, particularly when the polyol composition includes a blend of polyether and polyester polyols.

The polyether-epoxide polymer compositions can include additives such as surfactants, fillers, pigments, flame retardants, catalysts, viscosity modifiers, blowing agents, reactive diluents, and the like. The type and amount of additive used will depend on the requirements of the specific end-use application.

The polyether-epoxide polymer compositions can be formulated as elastomers, microcellular elastomers, coatings, sealants, adhesives, and other products. Elastomers can be formulated to give a wide range of Shore A or Shore D hardness values. Typical hardness values will range from Shore A 70 to Shore A 96, or from Shore A 85 to Shore A 96, more typically Shore A 90 to Shore A 96.

Elastomers from polyether-epoxide polymer compositions can be formulated to have increased total energy absorption ("T.E.A.") values as described hereinbelow when compared with those of conventional epoxy systems. The T.E.A. values will typically range from 10 to 500 lb·in./in.$^2$, 10 to 300 lb·in./in.$^2$, or 20 to 200 lb·in./in.$^2$. As shown in Tables 3 and 4, T.E.A. values can often be enhanced by including a polyester polyol in the polyol composition.

In some aspects, coatings from the polyether-epoxide polymer compositions exhibit good abrasion resistance compared with conventional epoxy systems, as reflected by Taber abrasion values less than 80 mg, less than 50 mg, less than 30 mg, or less than 20 mg when using wheel CS-17 under 1000 cycles at 1-kg load (see Tables 1-4).

In some aspects, particularly when the polyol composition includes a polyester polyol, coatings from the polyether-epoxide polymer compositions will have improved impact resistance compared with that of conventional epoxy systems (see, e.g., Table 3 and 4).

Inclusion of the polyester polyol can allow formulators to boost the modulus, elongation, and total energy absorption properties of elastomers as well as the impact and abrasion resistance of coatings. As shown in Tables 3 and 4, elastomers with an impressive balance of hardness, tensile strength, modulus, elongation, and energy absorption properties can be produced using polyol blends that include a polyester polyol with the high-functionality polyether polyol. Including the polyester polyol also provides well-cured coatings with good abrasion and impact resistance. Adhesives with good lap shear strength can also be made using the polyether/polyester polyol blends.

Processes for Making Polyether-Epoxide Polymer Compositions

1. Low-Temperature (0° C. to 40° C.) Process

In one aspect, the polyether-epoxide polymer composition is produced in a single reaction step, preferably under ambient conditions. The process comprises reacting at a temperature within the range of 0° C. to 40° C., in the presence of a catalyst, a mixture comprising a polyepoxide compound and a polyol composition. The polyepoxide compound has an equivalent weight within the range of 125 to 250 g/eq. The polyol composition comprises a polyether polyol, wherein the polyether polyol has a hydroxyl value within the range of 150 to 800 mg KOH/g and an average hydroxyl functionality within the range of 3.5 to 8.0. The ratio of epoxy equivalents of the polyepoxide compound to hydroxyl equivalents of the polyol composition is within the range of 0.5:1 to 3:1. The process produces a polyether-epoxide polymer composition having a glass-transition temperature as measured by differential scanning calorimetry within the range of −40° C. to 60° C., or in some aspects −30° C. to 35° C.

The low-temperature process is performed in the presence of a catalyst. In a preferred aspect, the catalyst comprises a Lewis acid compound. Suitable Lewis acid compounds are electron pair acceptors and include, for example, aluminum chloride, aluminum bromide, zinc chloride, boron trichloride, boron trifluoride, tin tetrachloride, antimony pentachloride, and the like. Boron trifluoride and especially complexes of boron trifluoride with electron donors (e.g., ethers, alcohols, carboxylic acids, polyols, amines, sulfides) are preferred Lewis acid compounds. Examples include boron trifluoride etherate, boron trifluoride tetrahydrofuran complexes, boron trifluoride/alcohol complexes, boron trifluoride/acetic acid complexes, boron trifluoride/phosphoric acid complexes, boron trifluoride dimethyl sulfide complexes, boron trifluoride amine complexes, boron trifluoride polyol complexes, and the like, and combinations thereof. Lewis acid complexes with ethers, alcohols, polyols, and amines are particularly preferred. Suitable catalysts include, for instance, LEECURE® B-610 and LEECURE® B-1310, complexes of boron trifluoride with a Lewis base, products of Leepoxy Plastics, Inc.

In other aspects, the low-temperature process is performed in the presence of a base catalyst. Amine catalysts are preferred. In some preferred aspects, the amine catalyst comprises an amine compound, a polyamine, a polyamide, or a mixture thereof. Tertiary amines are preferred amine compounds. Suitable amine catalysts include, for example, 1,4-diazabicyclo[2.2.2]octane, 2,4,6-tris(dimethylaminomethyl)phenol (e.g., "DMP-30"), 4-dimethylaminopyridine, N,N-dimethylbenzylamine, (4-dimethylamino-methyl)phenol, (2-dimethylaminomethyl)phenol, 2,4,6-tris(4-morpholinylmethyl)phenol, 1,3,5-tris(3-(dimethylamino)propyl)hexahydro-s-triazine (e.g., POLYCAT® 41 from Air Products or JEFFCAT® TR-90 from Huntsman), and the like, and mixtures thereof.

The amount of Lewis acid or base catalyst needed for good curing will depend on many factors that are within the skilled person's discretion, including the nature of the polyepoxide compound, the nature of the polyol composition, the particular catalyst selected, the kind of product (e.g., coating, adhesive, elastomer), the product dimensions, the reaction temperature, the desired pot life, and other factors. Generally, however, the amount of catalyst will be within the range of 0.01 to 10 wt. %, or 0.1 to 8 wt. %, or 1 to 5 wt. % based on the amount of polyether-epoxide polymer composition produced.

The low-temperature process is performed at a temperature within the range of 0° C. to 40° C., or 10° C. to 30° C., or in many cases, at room temperature.

In some aspects, it may be desirable to post-cure a product made by the low-temperature process at room temperature or elevated temperature (e.g., 50° C. to 150° C.) with or without control of relative humidity to more rapidly achieve ultimate properties. In general, when a Lewis acid catalyst is used, the post-cure can be accomplished at either room temperature or elevated temperature. When a base catalyst is used, an elevated temperature post-cure is more desirable.

2. Elevated-Temperature (40° C. to 100° C.) Process

In another aspect, the invention relates to an elevated-temperature process for making a polyether-epoxide polymer composition. The process comprises heating, at a temperature within the range of 40° C. to 100° C., a mixture comprising a polyepoxide compound and a polyol composition comprising a polyether polyol, as described above. The ratio of epoxy equivalents of the polyepoxide compound to hydroxyl equivalents of the polyol composition is within the range of 0.5:1 to 3:1. The resulting polyether-epoxide polymer composition has a glass-transition temperature as measured by differential scanning calorimetry within the range of −40° C. to 60° C., or in some aspects −30° C. to 35° C.

The elevated-temperature process can be performed with or without a catalyst. Suitable catalysts include the Lewis acid catalysts and base catalysts described earlier.

In some aspects, the mixture comprising the polyepoxide compound and the polyol composition is heated at a temperature within the range of 60° C. to 90° C., or 65° C. to 80° C.

In some aspects, it may be desirable to post-cure a product made by the elevated-temperature process at room temperature or elevated temperature (e.g., 50° C. to 150° C.) with or without control of relative humidity to more rapidly achieve ultimate properties. In general, when a Lewis acid catalyst is used, the post-cure can be accomplished at either room temperature or elevated temperature. When a base catalyst is used, an elevated temperature post-cure is more desirable.

The following examples merely illustrate the invention; the skilled person will recognize many variations that are within the spirit of the invention and scope of the claims.

Formulation Components

EPON® 828 (Hexion Specialty Chemicals): a liquid bisphenol A diglycidyl ether-based epoxy resin. Ave. eq. wt.: 189. Viscosity: 13,000 cP at 25° C.

EPALLOY® 5000 (CVC Thermoset Specialties): epoxidized hydrogenated bisphenol A. Ave. eq. wt.: 220 g/eq.

EPALLOY® 8240 (CVC Thermoset Specialties): epoxy phenol novolac resin. Ave. eq. wt.: 170 g/eq. Nominal functionality: 2.35.

MULTRANOL® 4030 (Covestro): sucrose-based polyether polyol. Hydroxyl number: 380 mg KOH/g. Nominal functionality: 5.8.

MULTRANOL® 4034 (Covestro): sucrose-based polyether polyol. Hydroxyl number: 470 mg KOH/g. Nominal functionality: 5.2.

MULTRANOL® 9158 (Covestro): PO-based polyether triol. Hydroxyl number: 470 mg KOH/g. Nominal functionality: 3.0.

CARPOL® PGP-2000 (Carpenter): PO-based polyether diol. Hydroxyl number: 56 mg KOH/g. Nominal functionality: 2.0.

CARPOL® GP-3000 (Carpenter): PO-based polyether triol. Hydroxyl number: 56 mg KOH/g. Nominal functionality: 3.0.

Poly(THF)® 2000 (BASF): Poly(tetrahydrofuran) diol. Hydroxyl number: 56 mg KOH/g. Nominal functionality: 2.0.

VORANOL® 280 (Dow): Sucrose/glycerin-based polyol. Nominal functionality: 7.0. Hydroxyl number: 280 mg KOH/g.

VORANOL® 370 (Dow): Sucrose/glycerin-based polyol. Nominal functionality: 7.0. Hydroxyl number: 370 mg KOH/g.

VORANOL® 490 (Dow): Sucrose/glycerin-based polyol. Nominal functionality: 4.3. Hydroxyl number: 490 mg KOH/g.

STEPANPOL® PC-1028-210 (Stepan Company): aromatic polyester polyol from 1,6-hexanediol and phthalic anhydride. Hydroxyl number: 210 mg KOH/g. Nominal functionality: 2.0.

IPA-DEG polyol: aromatic polyester polyol from isophthalic acid and diethylene glycol. Hydroxyl number: 236 mg KOH/g. Viscosity: 28,200 cP at 25° C. Nominal functionality: 2.0.

LEECURE® B-610 (Leepoxy Plastics, Inc.): boron trifluoride-based catalyst.

Preparation of IPA-DEG Polyol

Isophthalic acid (652.7 g) and diethylene glycol (688.9 g) are charged to a reaction vessel equipped with mechanical stirring, a temperature probe, a nitrogen inlet, and a packed condenser column having a side-arm condenser. The mixture is heated to 220° C. over about 1 h. Distillate is rapidly removed and the mixture becomes clear. After 8 h, the acid value reaches 13 mg KOH/g. After cooling overnight, heating resumes. When the temperature reaches 200° C., tetrabutoxytitanium (0.36 g) is added. The hydroxyl value is 213 mg KOH/g. Diethylene glycol (31 g) is added, and the mixture is heated to 220° C. until the reaction is deemed complete. Final hydroxyl value (corrected): 236 mg KOH/g.

Preparation of Polyether-Epoxide Polymers: Low-Temperature Process

Example 1

MULTRANOL® 4034 polyether polyol (48.8 g, product of Covestro) is mixed rapidly at room temperature with EPON® 828 resin (48.8 g, product of Hexion Specialty Chemicals) and LEECURE® B-610 catalyst (2.4 g, product of Leepoxy Plastics). The ratio of epoxy to hydroxyl equivalents (epoxy/OH eq. ratio) is 64/100. The mixture is clear after a few seconds. Mixing continues for 30 s. The material hardens after about 3.5 min. to give a cured product. Properties of polymers made from this material, including cast elastomers, coatings, and adhesives, appear in Table 1.

Examples 2 and 6-14 and Comparative Examples 3-5 and 15

The procedure of Example 1 is generally followed using an epoxy resin (EPON® 828, EPALLOY® 5000, or EPALLOY® 8240) and the polyether polyols shown in Tables 1 and 2. For each example, the weight ratio of epoxy compound to polyol composition is held at 1:1. The catalyst level is adjusted to achieve a 3.5 to 4-minute gel time. Properties of the resulting cast elastomers, coatings, and adhesives are given in the tables. Polyols having average hydroxyl values within the range of 3.5 to 8.0 are used in the inventive examples. For Comparative Examples 3-5 and 15, polyols having average hydroxyl functionalities within the range of 2.0 to 3.0 (PolyTHF® 2000, CARPOL® PGP-2000, CARPOL® GP-3000, and MULTRANOL® 9158) are used.

Examples 16-32

The procedure of Example 1 is generally followed using an epoxy resin (EPON® 828, Table 3 or EPALLOY® 8240, Table 4) and the blends of polyether and polyester polyols indicated in Tables 3 and 4. The polyester to polyether molar ratios are 50/50 or 75/25. In these examples, the catalyst is a mixture of boron trifluoride in a polyester polyol. For each example, the weight ratio of epoxy compound to polyol composition is held at 1:1. The catalyst level is adjusted to achieve a 3.5 to 4-minute gel time. Properties of the resulting cast elastomers, coatings, and adhesives are given in the tables. In each example, a polyether polyol having an average hydroxyl value within the range of 3.5 to 8.0 is used in combination with a polyester polyol.

Coating and Elastomer Sample Preparation

Each of the reaction products described above is either poured into a mold or is drawn down onto a surface to provide elastomer or coating samples, respectively, for testing. Elastomer samples are produced by pouring about 100 g of reaction mixture into 7"×7"×0.1" molds (ambient conditions, coated with mold release) about 90 s after mixing is initiated. The material is allowed to spread for about 30 s and is then covered. Tongue depressors are positioned at the edges of the mold to provide about 0.07" of venting around the perimeter. Dogbone samples (5.5"×0.5") are cut and conditioned at 25° C. and 50% relative humidity for 12 h prior to physical testing. The molded parts or coatings produced using the low-temperature, Lewis acid-catalyzed process are allowed to cure for at least 5 days at room temperature prior to testing.

Mechanical Properties

A universal testing machine (MTS ReNew™ system) and TestWorks® 4.11 software are used for sample testing and analysis. The central test portion of the dogbone samples is 0.5" wide and 1.65" long. Samples are placed in grips spaced 2.25" apart. A 1000 lb. load cell is used to measure properties at a tensile pull rate of 2"/min until sample breakage. Tensile strength, modulus, elongation-at-break, and total energy absorbed are measured at least in duplicate and averaged.

Total energy absorbed ("T.E.A.") is calculated by the universal testing machine software (Testworks 4.11) and obtained by normalizing the area under the stress-strain curve by the surface area of the central test portion (tapered portion) of the dogbone sample. The area under the stress-strain curve is calculated from the product of the total force (pounds) required to produce extension of the sample up to breakage (inches). For each sample, the surface area is 0.825 in.$^2$. Total energy absorbed is a measurement that allows for comparison of the relative toughness of each sample tested. The units of T.E.A. are lb·in./in.$^2$.

Hardness

Hardness of cured polymer samples is determined using a Type A durometer (Pacific Transducer, Model 306L) according to ASTM 2240-85. The dogbone samples described earlier are used.

Mechanical properties and hardness measurements are performed at 23° C.±1° C. and 50% relative humidity.

Glass-Transition Temperature

Glass-transition temperatures ($T_g$) are determined using a TA Instruments Discovery Series differential scanning calorimeter and Trios (V3.2) software from TA Instruments. Samples are prepared by trimming a 10-20 mg piece from the dogbone samples used for mechanical property testing. The sample is accurately weighed, crimped in the test pan, and placed in the sample holder of the instrument along with a reference pan. The sample is cooled to −50° C. and then warmed from −50° C. to 150° C. at 5° C. per minute. The polyether-epoxide polymer samples typically exhibit a strong $T_g$ signal with a midpoint within the range of −40° C. to 60° C. or from −30° C. to 35° C.

Coating Property Testing

Taber abrasion testing is performed in accord with ASTM D 4060 using a 5139 Taber Industries abrader. Separate experiments using the finer Calibrase® CS-17 and the coarser Calibrase® H-18 abrasion test wheels (Taber Industries) are performed for certain samples. The wheels are pressed to the surface with a 1000-g weight. Samples are measured for weight loss after 1000 cycles.

Impact resistance tests are performed with thin coatings on chromate/phosphate-treated steel (ACT test panels). The 4"×6" coupons are carefully coated using a #200 drawdown bar (BYK Co.). The Lewis acid-catalyzed samples are placed on a flat surface for at least 5 days at ambient conditions to cure. After curing, the coated coupons are kept at ambient conditions for an additional week prior to testing.

Impact strength is determined using a Gardner impact tester (from BYK). Using the 4-lb. projectile, coated steel samples are subjected to varying impact forces based on the height of projectile release. Impact strength (pounds per inch) is the force required to cause visual coating damage. Measurements are performed for direct impact (coated side impact) and indirect impact (impact on the opposite side of the coating).

Adhesive Preparation and Testing

The procedure of ASTM D-1002 is generally followed. Test samples are prepared and cured at ambient temperature using 1 in.×4 in.×0.063 in. cold-rolled steel (CRS) Q-Panel® test substrates (Q-Lab Corp.) as supplied. The polyether-epoxide polymer composition (100 g) is stirred in an open cup for 30 seconds. After about 1 minute, the reacting liquid material is dabbed onto a one-inch section at the end of one of the CRS test coupons. A second test coupon is placed on top of the first coupon to forming a 1-in$^2$ overlap section sandwiching the reacting liquid adhesive. A binder clip is affixed across the overlap area, and excess adhesive is removed. The assembly cures at ambient conditions on a flat surface for at least 5 days prior to lap shear strength testing.

Lap shear strength is measured using an Instron universal testing machine (MTS ReNew™ system) and TestWorks® 4.11 software. The binder clip is removed and the non-adhered ends of the metal coupon strips are secured in Instron 30 kN metal test grips (model #2716-015) affixed to the testing apparatus. The assembly is then pulled in the tensile direction at 0.05 in/min until overlap bond failure occurs. The peak stress at failure is measured in duplicate and averaged for each polyether-epoxide polymer system.

TABLE 1

Products from Polyether-Epoxide Polymers

| Example | 1 | 2 | C3 | C4 | C5 | 6 | 7 | 8 | 9 |
|---|---|---|---|---|---|---|---|---|---|
| Polyether-epoxide polymer compositions | | | | | | | | | |
| Polyether polyol[1] | Multranol 4034 | Multranol 4030 | PolyTHF 2000 | Carpol PGP-2000 | Carpol GP-3000 | Multranol 4034 | Multranol 4030 | Multranol 4034 | Multranol 4030 |
| OH val. (mg KOH/g) | 470 | 380 | 56 | 56 | 56 | 470 | 380 | 470 | 380 |
| Epoxy compound[2] | EPON ® 828 | EPON ® 828 | EPON ® 828 | EPON ® 828 | EPON ® 828 | EPALLOY ® 8240 | EPALLOY ® 8240 | EPALLOY ® 5000 | EPALLOY ® 5000 |
| Epoxy/OH eq. ratio | 64 | 80 | 530 | 550 | 550 | 71 | 87 | 54 | 69 |
| Leecure B-610[3] (wt. %) | 2.4 | 5.4 | 3.0 | 2.0 | 2.0 | 2.4 | 5.5 | 2.4 | 5.3 |
| Appearance | clear liq. | clear liq. | solid | clear liq. | clear liq. | clear liq. | clear liq. | clear liq. | clear liq. |
| Cast elastomers | | | | | | | | | |
| Shore A hardness | 98 | 96 | 80 | 78 | 82 | 97 | 96 | 80 | 64 |
| Tensile str. (psi) | 4380 | 1080 | 190 | 190 | 230 | 3500 | 1160 | 230 | 133 |
| Modulus (kpsi) | 123 | 41 | 1.3 | 1.0 | 1.2 | 93 | 29 | 0.5 | 0.3 |
| Elong. at break (%) | 6 | 64 | 16 | 21 | 21 | 12 | 65 | 84 | 46 |
| TEA[4] (lb · in./in.[2]) | 23 | 67 | 2 | 2 | 3 | 40 | 73 | 14 | 4 |
| Tg (° C.) | 32 | 21 | −30 | −25 | −20 | 31 | 20 | 10 | −2 |
| Adhesives | | | | | | | | | |
| CRS lap shear (psi) | 1230 | 1050 | 130 | 216 | 307 | 660 | 930 | 470 | 160 |
| Coatings | | | | | | | | | |
| D/I impact (lb/in) | >160, 70 | >160, >160 | — | — | — | — | >160, >160 | >160, >160 | >160, >160 |
| Taber abrasion[5], mg | 14 | 14* | — | — | — | 10 | 4 | 1 | 2* |

[1]MULTRANOL ® 4034 and MULTRANOL ® 4030 are sucrose-initiated polyether polyols, products of Covestro. CARPOL ® 2000 (2K polyPO diol) and CARPOL ® GP-3000 (glycerin-initiated 3K triol) are products of Carpenter Co. PolyTHF ® 2000, product of BASF.
[2]EPON ® 828, product of Hexion Specialty Chemicals; EPALLOY 8240 and EPALLOY 5000, products of CVC Thermoset Specialties.
[3]LEECURE ® B-610 boron trifluoride-based catalyst, product of Leepoxy Plastics, Inc.
[4]Total energy absorbed.
[5]CS-17, 1000 cycles, 1-kg load.
*Wt. gain in mg.

TABLE 2

Products from Polyether-Epoxide Polymers

| Example | 10 | 11 | 12 | 13 | 14 | C15 |
|---|---|---|---|---|---|---|
| Polyether-epoxide polymer compositions | | | | | | |
| Polyether polyol[1] | Voranol 370 | Voranol 280 | Voranol 490 | Voranol 280 | Voranol 280 | Multranol 9158 |
| OH val. (mg KOH/g) | 370 | 280 | 490 | 280 | 280 | 470 |
| OH functionality | 7.0 | 7.0 | 4.3 | 7.0 | 7.0 | 3.0 |
| Epoxy compound[2] | EPON ® 828 | EPON ® 828 | EPON ® 828 | EPALLOY ® 8240 | EPALLOY ® 5000 | EPON ® 828 |
| Epoxy/OH eq. ratio | 81 | 106 | 61 | 115 | 91 | 63 |
| Leecure B-610[3] (wt. %) | 5.4 | 4.2 | 3.6 | 4.4 | 4.0 | 2.6 |
| Appearance | clear liq. | clear liq. | clear liq. | clear liq. | clear liq. | clear liq. |
| Cast elastomers | | | | | | |
| Shore A hardness | 97 | 88 | 90 | 89 | 70 | 32 |
| Tensile str. (psi) | 1470 | 420 | 406 | 470 | 129 | 47 |
| Modulus (kpsi) | 53.0 | 1.7 | 4.6 | 2.2 | 0.58 | 0.04 |
| Elong. at break (%) | 87 | 42 | 90 | 39 | 23 | 192 |
| TEA[4] (lb · in./in.[2]) | 139 | 11 | 33 | 14 | 2 | 6 |
| Tg (° C.) | 18 | 12 | 9 | 11 | −6 | −11 |
| Adhesives | | | | | | |
| CRS lap shear (psi) | 410 | 613 | 843 | 846 | 139 | 162 |

TABLE 2-continued

Products from Polyether-Epoxide Polymers

| Example | 10 | 11 | 12 | 13 | 14 | C15 |
|---|---|---|---|---|---|---|
| Coatings | | | | | | |
| D/I impact (lb/in) | >160, >160 | >160, >160 | >160, 60 | — | 120, 80 | — |
| Taber abrasion[5], mg | 8 | 2 | 7* | 5* | 2 | — |

[1]MULTRANOL ® 9158, a glycerin-initiated polyether triol, product of Covestro. VORANOL ® 370, VORANOL ® 280, and VORANOL ® 490 are sucrose/glycerin polyols, products of Dow.
[2]EPON ® 828, product of Hexion Specialty Chemicals; EPALLOY 8240 and EPALLOY 5000, products of CVC Thermoset Specialties.
[3]LEECURE ® B-610 boron trifluoride-based catalyst, product of Leepoxy Plastics, Inc.
[4]Total energy absorbed.
[5]CS-17, 1000 cycles, 1-kg load.
*Wt. gain in mg.

TABLE 3

Products from Polyether/Polyester-Epoxide Polymers: EPON 828 Systems

| Example | 16 | 17 | 18 | 19 | 20 | 21 | 22 | 23 | 24 |
|---|---|---|---|---|---|---|---|---|---|
| Polyether-epoxide polymer compositions | | | | | | | | | |
| Polyester polyol[1] | 1028-210 | 1028-210 | 1028-210 | 1028-210 | IPA/DEG | IPA/DEG | IPA/DEG | IPA/DEG | IPA/DEG |
| Polyether polyol[2] | Voranol 370 | Voranol 370 | Voranol 280 | Voranol 280 | Voranol 370 | Voranol 370 | Voranol 280 | Voranol 280 | Multranol 4030 |
| Ester/ether mol. ratio | 50/50 | 75/25 | 50/50 | 75/25 | 50/50 | 75/25 | 50/50 | 75/25 | 50/50 |
| Epoxy compound[3] | EPON ® 828 | EPON ® 828 | EPON ® 828 | EPON ® 828 | EPON ® 828 | EPON ® 828 | EPON ® 828 | EPON ® 828 | EPON ® 828 |
| Epoxy/OH eq. ratio | 102 | 114 | 114 | 121 | 98 | 109 | 110 | 115 | 97 |
| $BF_3$/polyol cat. (wt. %) | 4.5 | 4.5 | 3.8 | 3.4 | 2.8 | 2.0 | 2.8 | 2.0 | 3.5 |
| Appearance | clear liq. | clear liq. | clear liq. | clear liq. | clear liq. | clear liq. | clear liq. | clear liq. | clear liq. |
| Cast elastomers | | | | | | | | | |
| Shore A hardness | 96 | 96 | 93 | 95 | 97 | 97 | 95 | 96 | 97 |
| Tensile str. (psi) | 1230 | 1240 | 860 | 1030 | 2900 | 3110 | 1040 | 1500 | 2250 |
| Modulus (kpsi) | 16.5 | 36.7 | 12.5 | 17.9 | 78.7 | 92.9 | 25.0 | 56.2 | 79.2 |
| Elong. at break (%) | 164 | 106 | 88 | 103 | 16 | 13 | 91 | 113 | 62 |
| TEA[4] (lb · in./in.[2]) | 137 | 114 | 65 | 64 | 56 | 45 | 89 | 196 | 152 |
| Tg (° C.) | 15 | 18 | 16 | 18 | 19 | 21 | 18 | 19 | 19 |
| Adhesives | | | | | | | | | |
| CRS lap shear (psi) | 1400 | 1440 | 1300 | 1600 | 1200 | 960 | 1140 | 1080 | 1700 |
| Coatings | | | | | | | | | |
| D/I impact (lb/in) | 120, <20 | >160, >160 | >160, >160 | >160, >160 | >160, >160 | >160, >160 | — | — | >160, >160 |
| Taber abrasion[5], mg | 4 | 2 | 4* | 1 | 7 | 10 | — | — | 3 |

[1]STEPANPOL ® PC 1028-210, an aromatic polyester polyol, product of Stepan. IPA/DEG, an aromatic polyester polyol.
[2]MULTRANOL ® 4030, a sucrose-initiated polyether polyol, product of Covestro. VORANOL ® 370 and VORANOL ® 280 are sucrose/glycerin polyols, products of Dow.
[3]EPON ® 828, product of Hexion Specialty Chemicals.
[4]Total energy absorbed.
[5]CS-17, 1000 cycles, 1-kg load.
*Wt. gain in mg.

TABLE 4

Products from Polyether/Polyester-Epoxide Polymers: EPALLOY 8240 Systems

| Example | 25 | 26 | 27 | 28 | 29 | 30 | 31 | 32 |
|---|---|---|---|---|---|---|---|---|
| Polyether-epoxide polymer compositions | | | | | | | | |
| Polyester polyol[1] | IPA/DEG | IPA/DEG | IPA/DEG | IPA/DEG | 1028-210 | 1028-210 | 1028-210 | 1028-210 |
| Polyether polyol[2] | Voranol 370 | Voranol 370 | Voranol 280 | Voranol 280 | Voranol 280 | Voranol 280 | Voranol 370 | Multranol 4030 |
| ester/ether mol. ratio | 50/50 | 75/25 | 50/50 | 75/25 | 50/50 | 75/25 | 75/25 | 50/50 |
| Epoxy compound[3] | EPALLOY ® 8240 | EPALLOY ® 8240 | EPALLOY ® 8240 | EPALLOY ® 8240 | EPALLOY ® 8240 | EPALLOY ® 8240 | EPALLOY ® 8240 | EPALLOY ® 8240 |
| Epoxy/OH eq. ratio | 107 | 118 | 119 | 126 | 123 | 132 | 126 | 105 |

TABLE 4-continued

Products from Polyether/Polyester-Epoxide Polymers: EPALLOY 8240 Systems

| Example | 25 | 26 | 27 | 28 | 29 | 30 | 31 | 32 |
|---|---|---|---|---|---|---|---|---|
| $BF_3$/polyol cat. (wt. %) | 2.8 | 2.0 | 3.2 | 2.4 | 4.0 | 3.6 | 3.4 | 3.3 |
| Appearance | clear liq. | clear liq. | clear liq. | clear liq. | clear liq. | clear liq. | clear liq. | clear liq. |
| Cast elastomers | | | | | | | | |
| Shore A hardness | 97 | 98 | 91 | 96 | 94 | 93 | 95 | 95 |
| Tensile str. (psi) | 3260 | 3190 | 1080 | 1890 | 890 | 1090 | 1540 | 1160 |
| Modulus (kpsi) | 94.2 | 90.9 | 25.5 | 68.4 | 5.1 | 8.1 | 31.1 | 40.1 |
| Elong. at break (%) | 13 | 18 | 86 | 26 | 81 | 107 | 110 | 87 |
| TEA[4] (lb · in./in.$^2$) | 44 | 66 | 90 | 42 | 56 | 90 | 153 | 92 |
| Tg (° C.) | 22 | 21 | 17 | 21 | 16 | 17 | 20 | 19 |
| Adhesives | | | | | | | | |
| CRS lap shear (psi) | 1720 | 1970 | 470 | 1630 | 1360 | 1310 | 1320 | 910 |
| Coatings | | | | | | | | |
| D/I impact (lb/in) | >160, >160 | >160, >160 | — | >160, >160 | >160, >160 | >160, >160 | — | — |
| Taber abrasion[5], mg | 7 | 8 | — | | | 2 | 1 | — | — |

[1]STEPANPOL ® PC 1028-210, an aromatic polyester polyol, product of Stepan. IPA/DEG, an aromatic polyester polyol.
[2]MULTRANOL ® 4030, a sucrose-initiated polyether polyol, product of Covestro. VORANOL ® 370 and VORANOL ® 280 are sucrose/glycerin polyols, products of Dow.
[3]EPALLOY 8240, product of CVC Thermoset Specialties.
[4]Total energy absorbed.
[5]CS-17, 1000 cycles, 1-kg load.
*Wt. gain in mg.

The preceding examples are meant only as illustrations; the following claims define the inventive subject matter.

We claim:

1. A polyether-epoxide polymer composition which comprises a reaction product of:
   (a) a polyepoxide compound having an equivalent weight within the range of 125 to 250 g/eq.; and
   (b) a polyol composition comprising a polyether polyol, wherein the polyether polyol has a hydroxyl value within the range of 150 to 800 mg KOH/g and an average hydroxyl functionality within the range of 3.5 to 8.0; and
   wherein the ratio of epoxy equivalents of the polyepoxide compound to hydroxyl equivalents of the polyol composition is within the range of 0.5:1 to 3:1, and the polyether-epoxide polymer composition has a glass-transition temperature as measured by differential scanning calorimetry within the range of −40° C. to 60° C.

2. The polyether-epoxide polymer composition of claim 1 wherein the polyol composition further comprises a polyester polyol.

3. The polyether-epoxide polymer composition of claim 1 wherein the polyepoxide compound is an aromatic polyepoxide.

4. The polyether-epoxide polymer composition of claim 3 wherein the aromatic polyepoxide is a reaction product of a bisphenol and epichlorohydrin having an equivalent weight within the range of 170 to 200 g/eq.

5. The polyether-epoxide polymer composition of claim 1 wherein the polyol composition comprises a polyether polyol produced at least in part from a sucrose initiator.

6. The polyether-epoxide polymer composition of claim 1 wherein the polyether polyol has a hydroxyl value within the range of 150 to 550 mg KOH/g and an average hydroxyl functionality within the range of 4.0 to 8.0.

7. The polyether-epoxide polymer composition of claim 1 having a glass-transition temperature within the range of −30° C. to 35° C.

8. The polyether-epoxide polymer composition of claim 1 wherein the ratio of epoxy equivalents of the polyepoxide compound to hydroxyl equivalents of the polyol composition is within the range of 0.8:1 to 2:1.

9. A coating comprising the polyether-epoxide polymer composition of claim 1.

10. An elastomer or a microcellular elastomer comprising the polyether-epoxide polymer composition of claim 1.

11. The elastomer or microcellular elastomer of claim 10 wherein the polyether polyol comprises a sucrose-initiated polyether polyol and the elastomer has a Shore A hardness of at least 90, a peak tensile stress of at least 1000 psi, and a modulus of at least 25,000 psi.

12. An adhesive or sealant comprising the polyether-epoxide polymer composition of claim 1.

13. A process which comprises reacting at a temperature within the range of 0° C. to 40° C. in the presence of a catalyst a mixture comprising a polyepoxide compound having an equivalent weight within the range of 125 to 250 g/eq. and a polyol composition comprising a polyether polyol, wherein the polyether polyol has a hydroxyl value within the range of 150 to 800 mg KOH/g and an average hydroxyl functionality within the range of 3.5 to 8.0, wherein the ratio of epoxy equivalents of the polyepoxide compound to hydroxyl equivalents of the polyol composition is within the range of 0.5:1 to 3:1 to produce a polyether-epoxide polymer composition having a glass-transition temperature as measured by differential scanning calorimetry within the range of −40° C. to 60° C.

14. The process of claim 13 wherein the reaction is performed at room temperature.

15. The process of claim 13 wherein the catalyst comprises a Lewis acid compound.

16. The process of claim 15 wherein the catalyst comprises a complex of boron trifluoride with an amine, an ether, an alcohol, a polyol, or a combination thereof.

17. The process of claim 13 wherein the catalyst is a base, and the polyether-epoxide polymer composition is post-cured by heating at a temperature within the range of 50° C. to 150° C.

18. A process which comprises heating, at a temperature within the range of 40° C. to 100° C., optionally in the presence of a catalyst, a mixture comprising a polyepoxide compound having an equivalent weight within the range of 125 to 250 g/eq. and a polyol composition comprising a polyether polyol, wherein the polyether polyol has a hydroxyl value within the range of 150 to 800 mg KOH/g and an average hydroxyl functionality within the range of 3.5 to 8.0, wherein the ratio of epoxy equivalents of the polyepoxide compound to hydroxyl equivalents of the polyol composition is within the range of 0.5:1 to 3:1 to produce a polyether-epoxide polymer composition having a glass-transition temperature as measured by differential scanning calorimetry within the range of −40° C. to 60° C.

19. The process of claim 18 wherein the mixture comprising the polyepoxide compound and the polyol composition is heated at a temperature within the range of 60° C. to 90° C.

20. The process of claim 18 wherein the heating is performed in the presence of a catalyst comprising a Lewis acid compound.

21. The process of claim 20 wherein the catalyst comprises a complex of boron trifluoride with an amine, an ether, an alcohol, a polyol, or a combination thereof.

22. The process of claim 18 wherein the heating is performed in the presence of a base catalyst, and the polyether-epoxide polymer composition is post-cured by heating at a temperature within the range of 50° C. to 150° C.

* * * * *